May 1, 1928.                    W. B. WELLS                    1,667,757
                                LIGHT SIGNAL
                             Filed Jan. 23, 1925

INVENTOR:
W. B. Wells,
BY A. R. Vencill
His ATTORNEY

Patented May 1, 1928.

1,667,757

UNITED STATES PATENT OFFICE.

WESLEY B. WELLS, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

LIGHT SIGNAL.

Application filed January 23, 1925. Serial No. 4,231.

My invention relates to light signals, and particularly to light signals of the type comprising a source of light and optical projecting means therefor consisting of a doublet made up of two spaced lenses.

I will describe one form of light signal embodying my invention, and will then point out the novel features thereof in claims.

Figure 1:
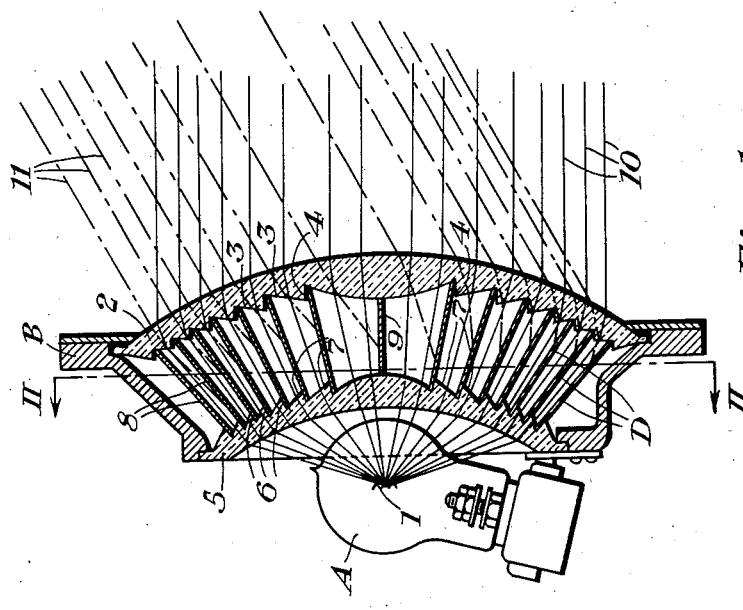
Figure 2:
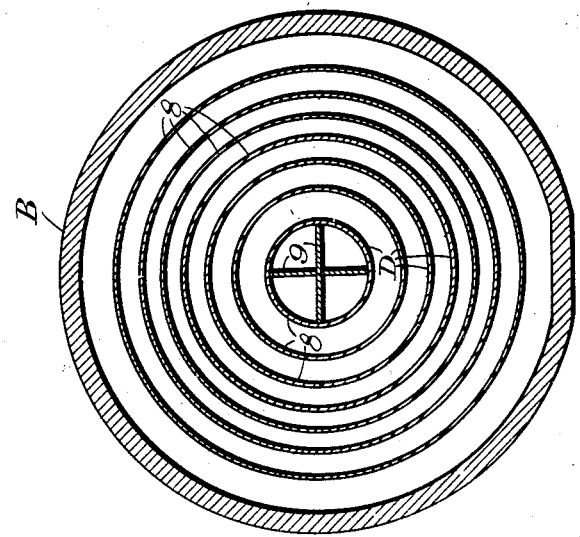

In the accompanying drawing, Fig. 1 is a vertical sectional view, illustrating one form of light signal embodying my invention. Fig. 2 is a sectional view along the line II—II of Fig. 1.

Similar reference characters refer to similar parts in both views.

Referring to the drawing, the signal comprises a suitable frame or housing B supporting a light source, here shown as an electric lamp A having an incandescent filament 1. The signal also comprises collimating means, here illustrated as a doublet comprising two echelon lenses 2 and 5. The front lens 2 is provided, on its inner face, with alternately disposed concentric grooves 3 and ridges 4, and the rear lens 5 is similarly provided, on its inner face, with alternately disposed concentric grooves 6 and ridges 7. The parts are so proportioned and disposed that light issuing from the filament 1 of the lamp A is refracted by the lens 5 so that light strikes lens 2 in paths which would, if extended, intersect in the focus of lens 2. The light is therefore projected from the signal in the direction of the solid lines 10 in a beam of parallel rays. The lamp may be controlled in any suitable manner and the signal is so located that the beam of light projected from the front of the signal is directed towards the point from which the signal indication is to be observed.

The apparatus thus far described is well known in the art and universally used in signaling systems. Under some conditions, however, stray beams of light, such, for example, as rays from the sun, incident upon the signal from a point outside the beam projected by the signal, may be reflected from the signal to give a false, or phantom, indication. For example, I will assume that sunlight falls upon the signal in the direction of the broken lines 11. With only the apparatus thus far described this sunlight would pass through the front lens, and a portion of such light would be reflected from the rear or smooth face of the rear lens and a portion would also be reflected from the surface of the lamp A. This reflected light would then be projected from the signal and, under some conditions might be mistaken for the main beam of the signal.

This condition is undesirable, and to prevent such phantom indications I provide a screen, designated in general by the reference character D, made up of a plurality of concentric shields 8 in the form of frustums of cones having a common apex at the focus of the lens 2. It is therefore plain that the shields 8 are parallel to the direction in which rays of light from lamp A travel between lenses 2 and 5. The shields 8 therefore absorb very little of the light from lamp A. The central shield 8 is further provided with two flat ribs 9 intersecting in a line passing through the filament 1 of lamp A. Each shield has one edge inserted in a groove 6 of lens 5 and the other edge inserted in a groove 4 of lens 2 and are therefore held rigidly in place.

The shields 8 and the ribs 9 are made of opaque material and are preferably painted flat black to absorb a maximum amount of the light incident upon them. It will be plain from the drawing that the screen D has substantially no effect upon the main signal beam issuing from the signal along lines 10, but that substantially all the light incident upon the signal from an outside source, as along lines 11, strikes some portion of screen D and is absorbed without being reflected from the signal.

It follows that with my invention dangerous phantom indications due to the reflection of stray beams of light are substantially eliminated.

Although I have herein shown and described only one form of light signal embodying my invention, it is understood that various changes and modifications may be made therein within the scope of the appended claims without departing from the spirit and scope of my invention.

Having thus described my invention, what I claim is:

1. A light signal comprising a doublet made up of two lenses, a light source located at the focus of said doublet, and an opaque shield interposed between the two lenses of said doublet and supported by said lenses and disposed parallel to rays from said source between such lenses.

2. A light signal comprising a doublet made up of two echelon lenses each having a plurality of concentric grooves on its inner face, a light source located at the focus of said doublet, and a plurality of concentric opaque frusto conical shields each extending from a groove in one lens to a groove in the other lens.

3. A light signal comprising a doublet made up of two lenses, a light source located at the focus of said doublet, and a plurality of concentric opaque shields located between said lenses and supported by said lenses, said shields being in the form of frustums of cones having a common apex located at the focus of one of said lenses.

In testimony whereof I affix my signature.

WESLEY B. WELLS.